United States Patent [19]

Hano et al.

[11] Patent Number: 4,865,348
[45] Date of Patent: Sep. 12, 1989

[54] ACTIVELY CONTROLLED AUTOMOTIVE SUSPENSION SYSTEM WITH LINE PRESSURE CONTROL UNDER LOW FLUID SOURCE PRESSURE

[75] Inventors: Sunao Hano; Naoto Fukushima; Yukio Fukunaga; Yohsuke Akatsu, all of Kanagawa; Hiroshi Yamanaka, Gifu, all of Japan

[73] Assignees: Nissan Motor Company, Limited, Yokohama; Kayaba Kogyo Kabushiki Kaisha, Tokyo, both of Japan

[21] Appl. No.: 167,835

[22] Filed: Mar. 4, 1988

[30] Foreign Application Priority Data

Mar. 6, 1987 [JP] Japan .................... 62-51399

[51] Int. Cl.[4] .......................................... B60G 17/00
[52] U.S. Cl. ................................... 280/707; 280/6.12
[58] Field of Search ............. 280/707, 6 R, 6 H, 6.1, 280/714, 840, 6.12

[56] References Cited

U.S. PATENT DOCUMENTS 4,350,354 9/1982 Dotti et al. ................... 280/6 H
4,697,822 10/1987 Blanz ........................... 280/6 H
4,702,490 10/1987 Yamaguchi et al. ............ 280/707

FOREIGN PATENT DOCUMENTS 51-42215 4/1976 Japan .
61-213910 9/1986 Japan .

Primary Examiner—Richard A. Bertsch
Attorney, Agent, or Firm—Foley & Lardner, Schwartz, Jeffery, Schwaab, Mack, Blumenthal & Evans

[57] ABSTRACT

An actively controlled suspension system employs a shut-off valve which is responsive to a source pressure dropping below a predetermined level to shut-off communication between a pressure return line for returning the fluid pressure to the pressure source from a hydraulic cylinder. The shut-off valve is disposed in a drain line connecting a drain port of a spool valve assembly and the pressure source. By the presence of the shut-off valve, substantial pressure difference between the hydraulic cylinder side and pressure source side of the spool valve is not created. Therefore, no leakage through the spool valve occurs and whereby the pressure in the hydraulic cylinder can be maintained even when the source pressure becomes substantially low or zero.

26 Claims, 4 Drawing Sheets $P = K_1 V_3 + P_0$

ACTIVELY CONTROLLED AUTOMOTIVE SUSPENSION SYSTEM WITH LINE PRESSURE CONTROL UNDER LOW FLUID SOURCE PRESSURE

BACKGROUND OF THE INVENTION

1. Field of the Invention

The present invention relates generally to an actively controlled suspension control system which varies suspension characteristics depending upon the vehicle driving condition. More specifically, the invention relates to an actively controlled suspension system which controls line pressure in the suspension system even when the pressure in a fluid source is substantially low or zero.

2. Description of the Background Art

The Japanese Patent First (unexamined) Publication (Tokkai) Showa No. 51-42215 discloses a hydropneumatic suspension system with vehicle height control operation. The disclosed system employs a fluid pump driven by a vehicular engine and an hydraulic cylinder. Pressurized fluid from the fluid pump is introduced into the hydraulic cylinder for adjusting the fluid pressure in the hydraulic cylinder for performing height adjustment of the vehicle. A poppet valve is employed for establishing fluid pressure from the fluid pump to the hydraulic cylinder and blocking fluid communication therebetween. When the engine stops, the fluid pump is accordingly stopped. The shown system allows manual operation for locking the line pressure by operating the poppet valve. Therefore, in the construction disclosed in the Tokkai Showa No. 51-42215, the line pressure in the hydraulic circuit of the suspension system can be maintained at the pressure immediately before the poppet valve is shut.

The poppet valve is thus effective in locking the line pressure in the hydraulic circuit. On the other hand, the poppet valve encounters difficulty in controlling fluid pressure in the hydraulic circuit in pressure feedback manner, since it merely operates in ON/OFF manner.

In the actively controlled suspension, it is required to control the pressure to be introduced into an hydraulic cylinder depending upon relative displacement between a vehicle body and a wheel axle. Therefore, as illustrated in the Japanese Patent First Publication (Tokkai) Showa No. 61-213911, a spool valve is employed for adjusting the pressure in the hydraulic cylinder to adjust the suspension characteristics. Control of the position of the spool valve is performed utilizing fluid pressure in one of a pair of pressure chambers in the hydraulic cylinder which has higher pressure than the other, as a pilot pressure. Namely, the spool valve adjusts path area in a path of working fluid depending on the magnitude of the pilot pressure so as to adjust the pressure in the pressure chambers and whereby adjusts the suspension characteristics in response to relative motion of the vehicle body and wheel axle.

In case of the spool valve, it is inevitable to cause internal leakage of the working fluid through a gap between the spool valve and a valve guide. Especially, magnitude of leakage becomes substantial when the pressure difference across the spool valve is great. Therefore, when the fluid pump is inoperative and thus the source pressure is substantially low, the significant pressure difference is created between the hydraulic cylinder and the fluid pump to cause leakage of the pressure from the hydraulic cylinder to the fluid pump or the fluid source. Therefore, while engine is not driven, pressure in the hydraulic cylinder drops at substantial level.

SUMMARY OF THE INVENTION

Therefore, it is an object of the present invention to provide an actively controlled suspension system which can solve the drawback in the conventional art.

Another object of the invention is to provide an actively controlled suspension system which can control line pressure while the fluid pump is inoperative condition.

A further object of the invention is to provide an actively controlled suspension system which can hold the fluid pressure in a hydraulic cylinder even when the fluid pump is not operative and thus no fluid source pressure is supplied.

In order to accomplish the aforementioned and other objects, an actively controlled suspension system, according to the invention, employs a shut-off valve which is responsive to a source pressure dropping below a predetermined level to shut-off communication between a pressure return line for returning the fluid pressure to the pressure source from a hydraulic cylinder. The shut-off valve is disposed in a drain line connecting a drain port of a spool valve assembly and the pressure source.

By the presence of the shut-off valve, substantial pressure difference between the hydraulic cylinder side and pressure source side of the spool valve is not created. Therefore, no leakage through the spool valve occurs and whereby the pressure in the hydraulic cylinder can be maintained even when the source pressure becomes substantially low or zero.

In addition, the actively controlled suspension system, according to the invention, employs an one-way valve. The one way valve is disposed in a pressure supply line for supplying the source pressure to the hydraulic cylinder.

In the practical construction, the shut-off valve is held open as long as the source pressure is held higher than the predetermined pressure. Therefore, the shut-off valve will never interfere suspension control which the source pressure is higher than the predetermined pressure, and namely, while the pressure source is active.

According to one aspect of the invention, an actively controlled suspension system comprises an hydraulic cylinder disposed between a vehicle body and a suspension member rotatably supporting a vehicular wheel, the hydraulic cylinder defining an internal space filled with a working fluid, a piston thrustingly disposed within the hydraulic cylinder and dividing the internal space of the hydraulic cylinder into first and second chambers, the piston being displacable according to relative motion between the vehicle body and the suspension member in bounding and rebounding directions, an hydraulic means associated with the first chamber of the hydraulic cylinder for adjusting the fluid pressure in the first chamber for controlling attitude of the vehicle, the hydraulic means including a pressure source and a pressure control valve which is electrically controlled for introducing pressurized working fluid into the first chamber and draining the working fluid in the first chamber depending upon the vehicle driving condition, and an hydraulic circuit means for connecting the pressure source means and the pressure control valve supplying pressurized fluid to the pressure control valve and returning the fluid to the pressure source, the hydraulic circuit means being responsive to a source fluid pressure generated by the pressure source means below a predetermined pressure for blocking fluid flow from the pressure control valve to the pressure source means.

According to another aspect of the invention, an actively controlled suspension system comprises an hydraulic cylinder disposed between a vehicle body and a suspension member rotatably supporting a vehicular wheel, the hydraulic cylinder defining an internal space filled with a working fluid, a piston thrustingly disposed within the hydraulic cylinder and dividing the internal space of the hydraulic cylinder into first and second chambers, the piston being displacable according to relative motion between the vehicle body and the suspension member in bounding and rebounding directions, hydraulic means associated with the first chamber of the hydraulic cylinder for adjusting the fluid pressure in the first chamber for controlling attitude of the vehicle, the hydraulic means including a pressure source and a pressure control valve which is electrically controlled for introducing pressurized working fluid into the first chamber and draining the working fluid in the first chamber depending upon the vehicle driving condition, the pressure control valve comprising a valve housing defining a valve bore, an inlet port connected to the pressure source means, a drain port connected to the pressure source means, and an outlet port connected to the first chamber of the hydraulic cylinder, a valve member disposed within the valve bore for thrusting movement therein for selectively establishing communication between the outlet port and the inlet port and between the outlet port and the drain port for controlling fluid pressure in the first chamber, and an electrically operable actuator associated with the valve member for driving the latter to control the valve position according to the vehicle driving condition, and an hydraulic circuit means for connecting the pressure source means and the pressure control valve supplying pressurized fluid to the pressure control valve and returning the fluid to the pressure source, the hydraulic circuit means including a supply line connecting the inlet port of the pressure control valve to the pressure source for supplying the source fluid pressure to the inlet port, a drain line for connecting the drain port of the pressure control valve to the pressure source means for returning the pressurized fluid from the pressure control valve to the pressure source means, and the hydraulic circuit means including a source fluid pressure responsive valve means being responsive to a source fluid pressure generated by the pressure source means below a predetermined shut-off pressure for blocking fluid flow from the pressure control valve to the pressure source means via the drain line.

According to a further aspect of the invention, an actively controlled suspension system comprises an hydraulic cylinder disposed between a vehicle body and a suspension member rotatably supporting a vehicular wheel, the hydraulic cylinder defining an internal space filled with a working fluid, a piston thrustingly disposed within the hydraulic cylinder and dividing the internal space of the hydraulic cylinder into first and second chambers, the piston being displacable according to relative motion between the vehicle body and the suspension member in bounding and rebounding directions, an hydraulic means associated with the first chamber of the hydraulic cylinder for adjusting the fluid pressure in the first chamber for controlling attitude of the vehicle, the hydraulic means including a pressure source and a pressure control valve which is electrically controlled for introducing pressurized working fluid into the first chamber and draining the working fluid in the first chamber depending upon the vehicle driving condition, and an hydraulic circuit means for connecting the pressure source means and the pressure control valve supplying pressurized fluid to the pressure control valve and returning the fluid to the pressure source, and the hydraulic circuit means including a source fluid pressure responsive valve means being responsive to a source fluid pressure generated by the pressure source means below a predetermined shut-off pressure for blocking fluid flow from the pressure control valve to the pressure source means via the drain line, and a pressure adjusting means for adjusting the fluid pressure in the drain line upstream of the source fluid pressure responsive valve means to be lower than or equal to a given pressure.

In the construction set forth above, the hydraulic circuit means may incorporate a source fluid pressure responsive valve means provided in a drain line for returning the working fluid from the pressure control valve to the pressure source means, the source pressure responsive valve means being operated to an open position for establishing communication between the pressure control valve and the pressure source means via the drain line while the source fluid pressure is higher than the predetermined shut-off pressure and to a shut-off position for blocking fluid communication through the drain line in response to the source fluid pressure lower than or equal to the predetermined shut-off pressure. The hydraulic circuit means may further include a supply line connecting the pressure source means and the pressure control valve for supplying the pressurized fluid to the latter therethrough, and a pilot line connecting the supply line to the source fluid pressure responsive valve means to introduce the pressure in the supply line as the source fluid pressure indicative pressure.

The pressure adjusting means may practically comprises a by-pass line connecting the drain line upstream of the source fluid pressure responsive valve means and down stream thereof by-passing the source fluid pressure responsive valve means and a pressure relief valve disposed in the by-pass line, which pressure relief valve being set a set pressure at the given pressure.

In the practical construction, the pressure source means comprises a pressure unit designed to be driven by means of an automotive engine. The pressure unit may comprise a fluid pump, for example.

DESCRIPTION OF THE PREFERRED EMBODIMENT

Figure 1:
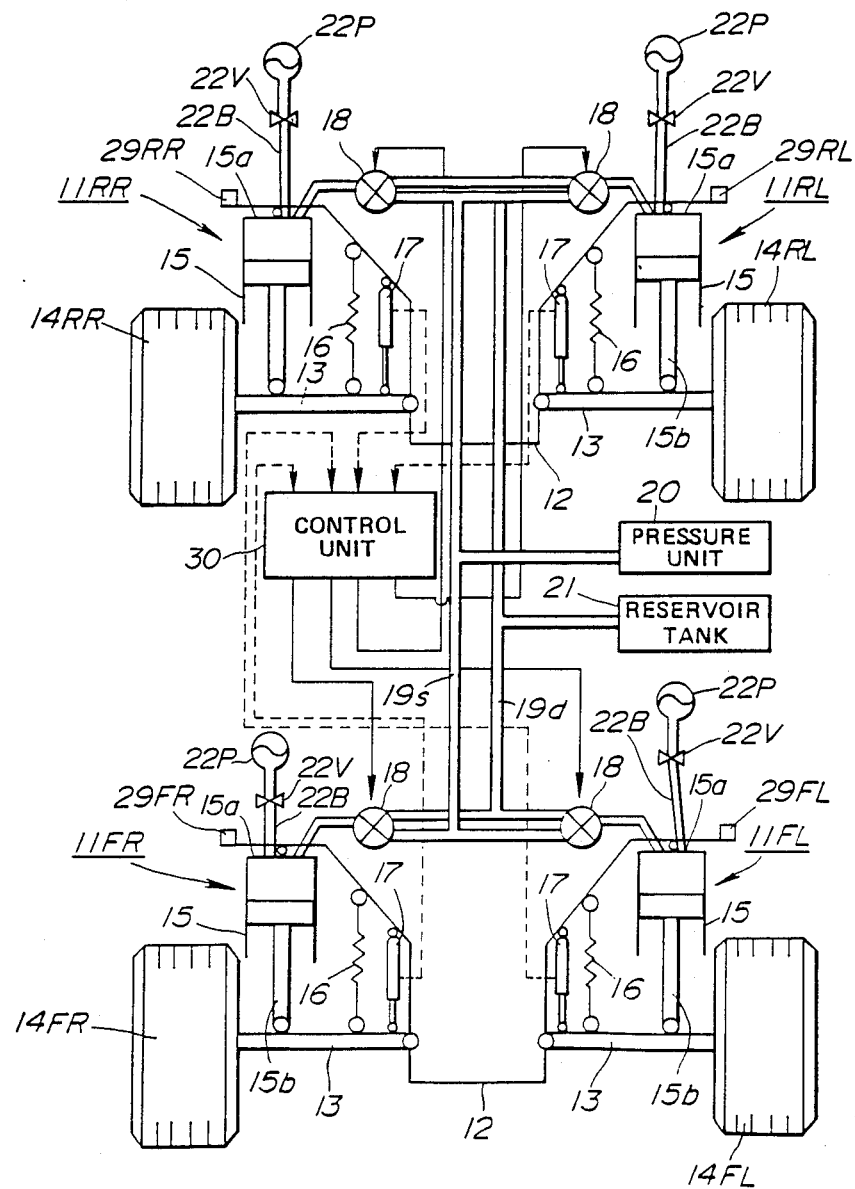
FIG. 1 is a schematic illustration of general construction of an actively controlled suspension system, to which the preferred embodiment of a line pressure control according to the present invention is applicable.

Referring now to the drawing, particularly to FIG. 1, a vehicle has four suspension systems 11FL, 11FR, 11RL and 11RR for respectively suspending vehicle body 12 on front-left, front-right, rear-left and rear-right road wheels 14FL, 14FR, 14RL and 14RR. Each of the front-left, front-right, rear-left and rear-right suspension systems 11FL, 11FR, 11RL and 11RR comprises a suspension member 13, such as a suspension link, a suspension arm and so forth, and a suspension assembly 15 which is interposed between the vehicle body 12 and the suspension member 13. The suspension assembly 15 has an hydraulic cylinder 15A which serves as an actuator for generating damping force against bounding and rebounding motion between the vehicle body and the suspension member, and a coil spring 16.

It should be appreciated that, in the shown embodiment, the coil spring 16 is not necessary to damp dynamic kinematic energy and should resiliently support only static load to be exerted between the vehicle body and the suspension member. However, it should be, of course, possible to employ the coil spring which can be strong enough to damp part of dynamic kinematic energy in relative bounding and rebounding motion of the vehicle body and the suspension member.

The hydraulic cylinder 15A has a hollow cylinder housing 15a filled with a viscous working fluid and a piston 15c sealingly and thrustingly disposed within the internal space of the cylinder housing to divide the cylinder space into upper and lower fluid chambers 15d and 15e. A piston rod 15b extends through one end of the cylinder housing 15a. The other end of the cylinder housing 15a is connected to one of the vehicle body 12 and the suspension member 13. On the other hand, the end of the piston rod 15b is connected to the other of the vehicle body 12 and the suspension member 13.

The hydraulic cylinder 15A of the suspension assembly 15 is connected to an hydraulic pressure source unit 20 via an hydraulic circuit which includes pressure control valve 18. The pressure control valve 18 is electrically operable and connected to a microprocessor-based control unit 30. The hydraulic circuit 19 includes a supply line 19s and a drain line 19d. The pressure source unit generally comprises a pressure unit 20 and a reservoir tank 21. The pressure unit 20 is connected to the reservoir tank 21 to suck the viscous working fluid in the reservoir tank 21 to feed to the pressure control valve 18 via the supply line 19s. On the other hand, the drain line 19d is connected to the reservoir 21 to return the working fluid thereto.

As seen from FIG. 1, pressure accumulators 22P are communicated with the upper fluid chamber 15d of the hydraulic cylinder 15A via a pressure line 22B. A throttle valve 22V is inserted between the upper fluid chamber 15d and the pressure accumulator 22P. In the shown embodiment, the throttle valve 22V has a fixed throttling rate.

Figure 2:
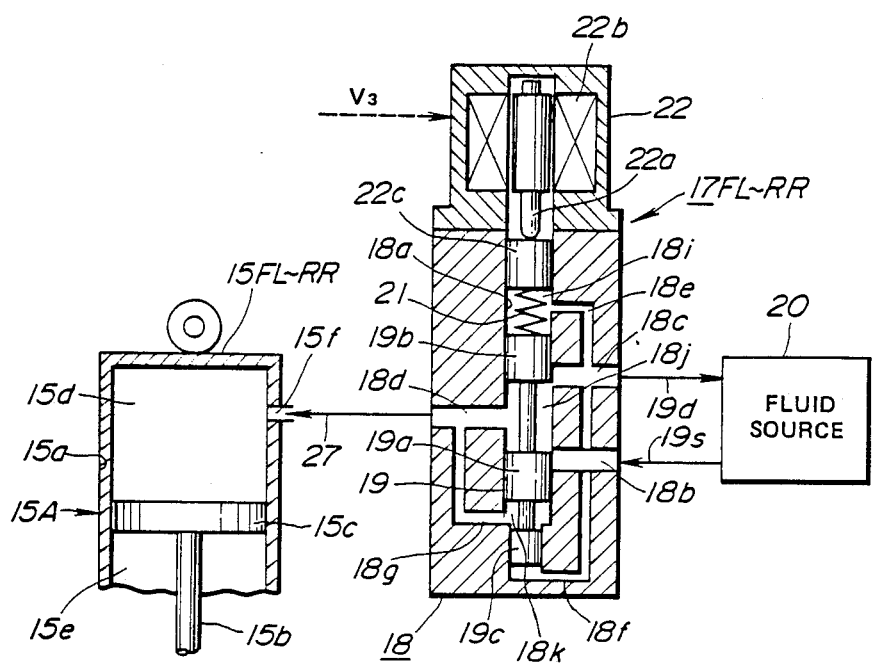
FIG. 2 is a sectional view of a pressure control valve assembly to be employed in the preferred embodiment of the actively controlled suspension system according to the invention.

FIG. 2 shows the detailed construction of the hydraulic cylinder 15A and the pressure control valve 18. As will be seen from FIG. 2, the hollow cylinder housing 15a is formed with a port 15f communicating the upper fluid chamber 15d to an outlet port 18d of the pressure control valve 18 via a communication line 27. Though FIG. 2 does not show clear construction, the lower fluid chamber 15e is defined as an enclosed space and is filled with the viscous working fluid. The pressure of the working fluid in the lower fluid chamber 15e at an initial position of the piston 15c serves as a reference pressure and per se serves as resistance for downward movement of the piston.

The pressure control valve 18 has a valve housing 18A having the aforementioned outlet port 18d, an inlet port 18b and a drain port 18c. Respective inlet port 18b, the drain port 18c and the outlet port 18d are connected to a valve bore 18a defined within the valve housing 18A. A valve spool 19 is disposed within the valve bore 18a for thrusting movement therein. The valve spool 19 has first, second and third lands 19a, 19b and 19c. As will be seen from FIG. 2, the third land 19c has smaller diameter than that of the first and second lands 19a and 19b. The third land 19c defines a fifth pressure control chamber 18h which is connected to the drain port 18c via a drain path 18f. An actuator piston 22c is also disposed within the valve bore 18a. The actuator piston 22c opposes the second land 19b in spaced apart relationship to define a second pressure control chamber 18i which is connected to the drain port 18c via a drain path 18e. An annular pressure chamber 18j is defined between the first and second lands 19a and 19b. The pressure chamber 18j is constantly communicated with the outlet port 18d and whereby communicated with the upper fluid chamber 15d. On the other hand, the pressure chamber 18j shifts according to shifting of the valve spool 19 to selectively communicate with the inlet port 18b and the drain port 18c. On the other hand, an pressure control chamber 18k is defined between the first and third lands 19a and 19c. The pressure control chamber 18k is in communication with the outlet port 18d via a pilot path 18g. A bias spring 22d is interposed between the actuator piston 22c and the valve spool 19. The actuator piston 22c contacts with an actuator rod 22a of an electrically operable actuator 22 which comprises an electromagnetic solenoid. The solenoid 22 comprises a proportioning solenoid.

Figure 3:
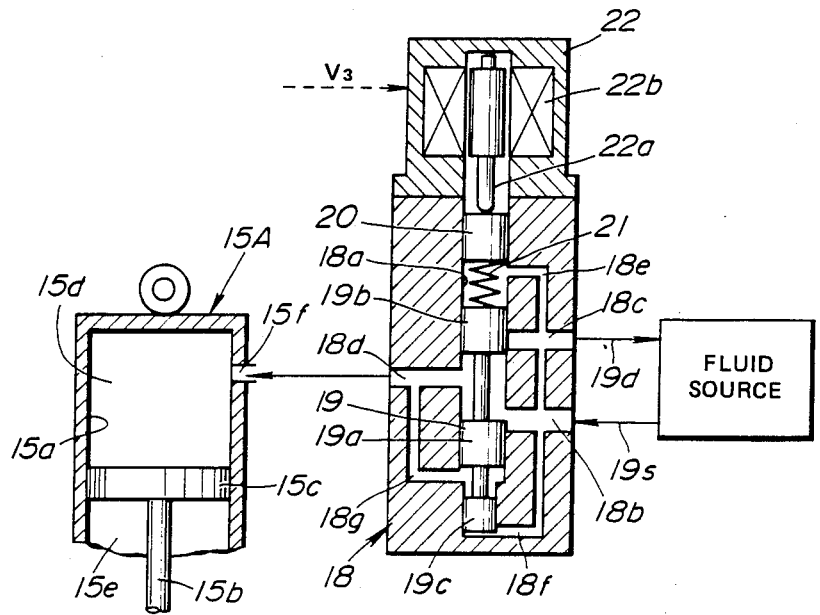
FIGS. 3(a) and 3(b) are sectional view similar to FIG. 2, but showing the conditions where a piston in the pressure control valve assembly is shifted downwardly for reducing fluid pressure in a fluid chamber of an hydraulic cylinder in the suspension system and upwardly to increase the fluid pressure in the fluid chamber.
Figure 3:
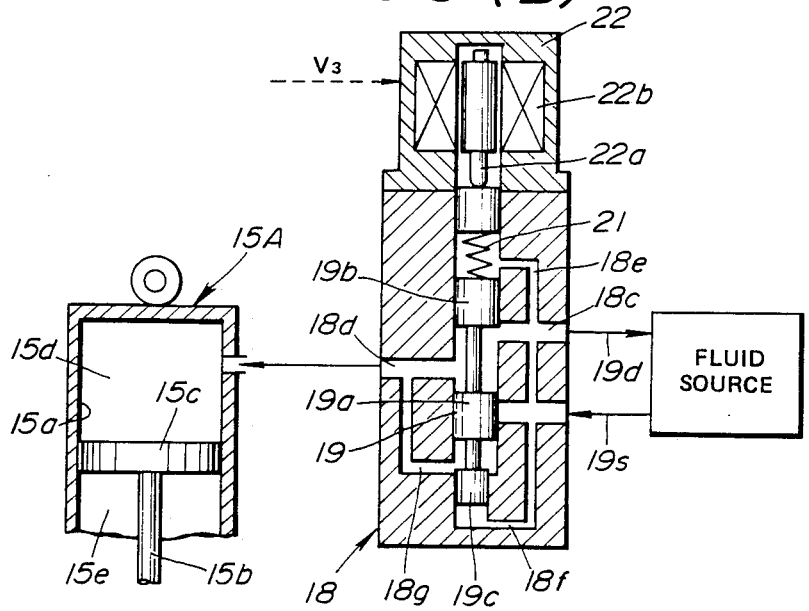

In order to increase the supply pressure of the working fluid, the spool valve 19 is shifted to the position shown in FIG. 3(A) to increase path area at a throttle constituted at the inner end of the inlet port 18b by means of the land 19a of the spool valve 19. On the other hand, in order to decrease the supply pressure of the working fluid, the spool valve is shifted to the position shown in FIG. 3(B) to decrease the path area at the throttle of the inner end of the inlet port 18b and opens the drain port 18 which is normally blocked by means of the land 19b of the spool valve.

Construction of the pressure control valves should not be limited to the construction as illustrated in FIGS. 2, 3(A) and 3(B) but can be replaced with any appropriate constructions. For example, the pressure control valve constructions as illustrated in European Patent First Publication No. 01 93 124, set forth above, can also be employed. The disclosure of the aforementioned European Patent First Publication No. 0193124 is herein incorporated by reference for the sake of disclosure.

Figure 4:
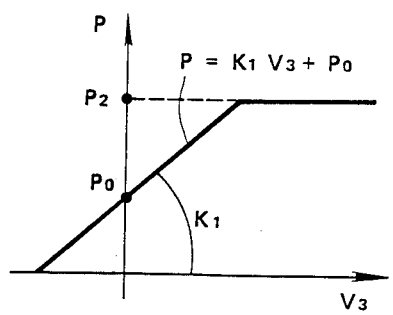
FIG. 4 is a graph showing variation of the fluid pressure in an hydraulic cylinder as controlled by the pressure control valve assembly of FIG. 2.

As seen from FIG. 2, the proportioning solenoid 22 comprises the actuator rod 22a and a solenoid coil 22b. The solenoid coil 22b is energized by suspension control signal $V_3$ from the controller 30. In the shown embodiment of the pressure control valve, the working fluid pressure P at the outlet port 18d is variable according to the characteristics shown in FIG. 4. Namely, when the control value $V_3$ as represented by the suspension control signal is zero, the pressure P at the outlet port 18 becomes $P_0$ determined according to a predetermined offset pressure $P_0$. When the suspension control signal value in positive value increases, the fluid pressure P at the outlet port 18d increases with a predetermined proportioning gain $K_1$. Namely, by increasing of the suspension control value $V_3$, the actuator rod 22a is driven downwardly in FIG. 2 at a magnitude toward to position of FIG. 3(A) to achieve increasing of the fluid pressure with the predetermined proportioning gain $K_1$. The fluid pressure P at the outlet port 18d saturate at the output pressure $P_2$ of the pressure unit 20. On the other hand, when the suspension control signal value $V_3$ decreases, the pressure P decreases to zero to by shifting of the actuator rod 22a toward the direction to FIG. 3(B).

The actuator rod 22a of the proportioning solenoid 22 is associated with the actuator piston 22c. Contact between the actuation rod 22a and the actuator piston 22c can be maintained by the resilient force of the bias spring 22d which normally biases the actuator piston toward the actuation rod. On the other hand, the spring force of the bias spring 22d is also exerted on the valve spool 19 to constantly bias the valve spool downwardly in FIG. 2. The valve spool 19 also receives upward hydraulic force from the pressure control chamber 18k. Therefore, the valve spool 19 is oriented at the position in the valve bore at the position where the downward bias of the bias spring 22d balances with the upward hydraulic force of the pressure control chamber 18k.

When bounding motion occurs at the suspension member, the piston 15c of the hydraulic cylinder 15A shifts upwardly to cause increasing of the fluid pressure in the upper chamber 15d. This causes increasing of the fluid pressure at the outlet port 18d of the pressure control valve 18. As a result, the fluid pressure in the pressure control chamber 18k increases by the pressure introduced through the pilot path 18g to destroy the balance between the downward bias of the bias spring 22d and the upward hydraulic force of the pressure control chamber 18k. This causes upward movement of the valve spool 19 against the spring force of the bias spring 22d, as shown in FIG. 3(B). As a result, path area of the drain port 18c increases and the inlet port 18b becomes being blocked. Therefore, the fluid pressure in the fluid chamber 15d is drained through the drain port. Therefore, the increased fluid pressure in the fluid chamber 15d of the hydraulic cylinder 15A can be successfully absorbed so that the bounding energy input from the suspension member will not be transmitted to the vehicle body.

When rebounding motion occurs at the suspension member, the piston 15c of the hydraulic cylinder 15A shifts downwardly to cause decreasing of the fluid pressure in the upper chamber 15d. This causes decreasing of the fluid pressure a the outlet port 18d of the pressure control valve 18. As a result, the fluid pressure in the pressure control chamber 18k decreases by the pressure introduced through the pilot path 18g to destroy the balance between the downward bias of the bias spring 22d and the upward hydraulic force of the pressure control chamber 18k. This causes downward movement of the valve spool 19 against the spring force of the bias spring 22d, as shown in FIG. 3(A). As a result, path area of the inlet port 18b increases and the drain port 18c becomes blocked. Therefore, the fluid pressure in the fluid chamber 15d is increased by the pressure introduced through the inlet port. Therefore, the decreased fluid pressure in the fluid chamber 15d of the hydraulic cylinder 15A can be successfully absorbed so that the rebounding energy input from the suspension member will not be transmitted to the vehicle body.

Here, since n flow resisting element, such as an orifice, or throttling valve, is disposed between the fluid reservoir 21 and the drain port 18c, no damping force against the upward motion of the piston 15c in the hydraulic cylinder 15A will be produced in response to the bounding motion of the suspension member. Since the damping force exerted on the piston 15c serves to allow transmission of the part of bounding energy to the vehicle body to cause rough ride feeling, the shown embodiment of the suspension system may provide satisfactorily high level riding comfort by completely absorbing the bounding and rebounding energy set forth above.

In the practical suspension control operation, the control unit 30 control performs adjustment of damping characteristics by operating the pressure control valves depending upon various suspension control parameters. For example, the European Patent First (unexamined) Publications Nos. 02 49 246 and 02 49 209 discloses relevant suspension control in the actively controlled suspension systems. The disclosure of the above-identified European Patent First Publications are herein incorporated by reference for the sake of disclosure.

Figure 5:
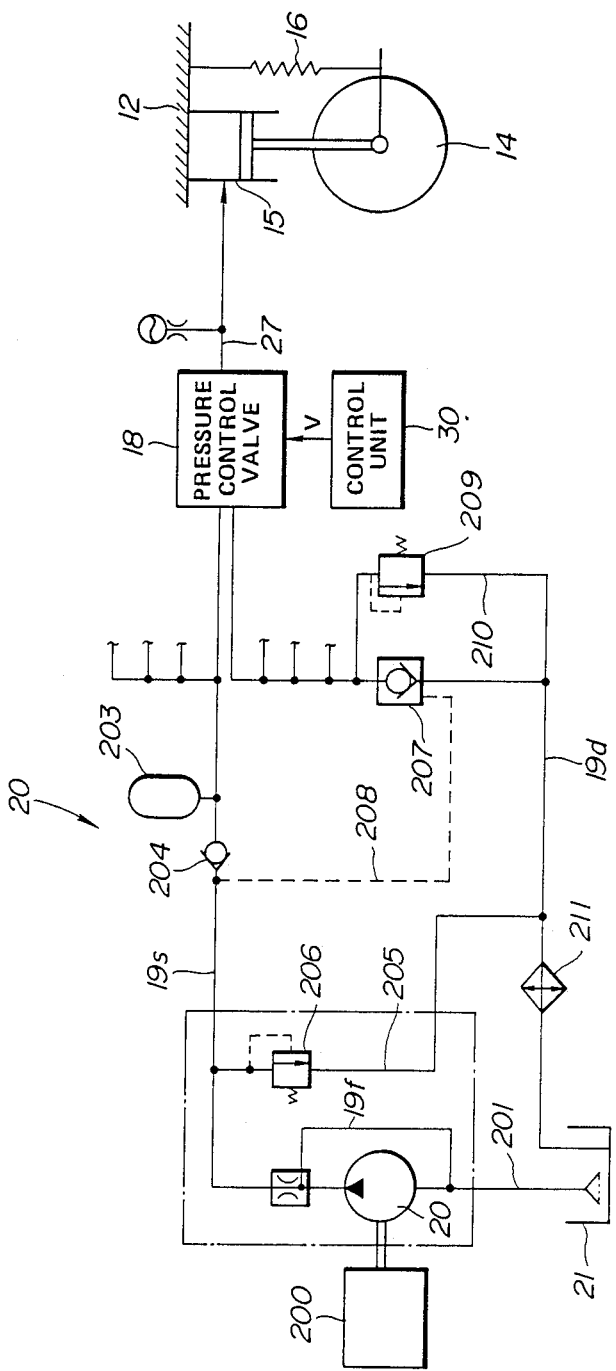
FIG. 5 is a schematical and diagramatical illustration of an hydraulic circuit to be employed for the preferred embodiment of the line pressure control of the invention.

FIG. 5 shows detailed circuit construction of the preferred embodiment of the pressure source unit to be employed in the suspension control system according to the invention. As set forth, the pressure source unit includes the pressure unit 20 which comprises a fluid pump, and is connected to the reservoir 21 via a suction pipe 201 which is driven by means of an automotive engine 200. The outlet of the pressure unit 20, through which the pressurized working fluid is fed, is connected to the inlet port 18b of the pressure control valve 18 via the supply line 19s. A pressure regulating orifice 202 is disposed in the supply line 19s for suppressing pulsating flow of the working fluid and thereby regulate the output pressure of the pressure unit 20 to be delivered to the pressure control valve 18. A feedback line 19f is connected to the upstream of the pressure regulating orifice 202 at one end. The other end of the feedback line 19f is connected upstream of the inlet of the pressure unit 20. Therefore, excessive fluid between the pressure unit 20 and the orifice 202 is fed back to the inlet side of the pressure unit.

A pressure accumulator 203 is also connected to the supply line 19s to receive therefrom the pressurized fluid for accumulating the pressure. An one-way check valve 204 is disposed in the supply line 19s at the position upstream of the junction between the pressure accumulator 203 and the supply line 19s.

A pressure relief line 205 is also connected to the supply line 19s at the position intermediate between the pressure regulating orifice 202 and the one-way check valve 204, at one end. The other end of the pressure relief line 205 is connected to the drain line 19d. A pressure relief valve 206 is disposed in the pressure relief line 205. The pressure relief valve 206 is responsive to the fluid pressure in the supply line 19s higher than a give value to drain part of the working fluid to the drain line for maintaining the pressure in the supply line 19s below the given pressure value.

On the other hand, a shut-off valve 207 is disposed in the drain line 19d. The shut-off valve 207 is also connected to the supply line 19s upstream of the one-way check valve 204 to receive therefrom the pressure in the supply line as a pilot pressure, via pilot line 208. The shut-off valve 207 is designed to be maintained at open position as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 19d may flow therethrough to the o reservoir tank 21. On the other hand, the shut-off valve 207 is responsive to the pilot pressure drops below the given pressure level to be switched into shut-off position. At the shut-off position, the shut-off valve blocks fluid communication between the drain port 18c and the reservoir tank 21.

In parallel relationship to the shut-off valve, a pressure relief valve 209 is provided. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 19d upstream thereof, higher than a set pressure, e.g. 30 kgf/cm, in order to establish fluid communication between the upstream side and downstream side of the shut-off valve to allow the excessive pressure at the upstream side drain line 19d to be drained therethrough. Therefore, the pressure relief valve 209 limits the maximum pressure at the set pressure. The set pressure of the pressure relief valve 209 corresponds to the offset pressure $P_0$ of FIG. 4.

An oil cooler 211 is disposed in the drain line 19d for cooling the working fluid returning to the reservoir tank 21.

Pressurized fluid supply operation to be taken place by the pressure source unit as set forth above will be discussed below.

While the automotive engine 200 is running, the fluid pump as the pressure unit 20 is driven. Therefore, the working fluid in the reservoir tank 21 is sucked via the suction pipe 201 and pressurized through the pressure unit 20. The pressurized working fluid is discharged from the outlet of the pressure unit 20 and fed to the pressure control valve 18 via the supply line 19s including the pressure regulating orifice 202 and the one-way check valve 204. When the pressure control valve 18 in a position of FIG. 3(A), the pressurized working fluid passes the pressure control valve and is introduced into the upper fluid chamber 15d of the hydraulic cylinder 15. On the other hand, when the pressure control valve 18 is in the position of FIG. 3(B) to block communication between the supply line 19s and the upper fluid chamber 15d, the line pressure in the supply line increases. When the line pressure in the supply line 19s becomes higher than a set pressure of the pressure relief valve 206 in the pressure relief line 205, the excessive pressure higher than the set pressure is fed to the drain line 19d via the pressure relief valve 206 and thus returned to the reservoir tank 21.

The fluid pressure in the supply line 19s is also fed to the shut-off valve 207 via the pilot line 208. As set forth, the shut-off valve 207 is placed at open position as long as the pilot pressure introduced through the pilot line 208 is held higher than or equal to the set pressure thereof. Therefore, fluid communication between the pressure control valve 18 and the reservoir tank 21 is maintained. When the pressure control valve 18 is in the position of FIG. 3(B), the working fluid is thus returned to the reservoir tank 21 via the drain line 19d via the shut-off valve 207 and the oil cooler 211.

The shut-off valve 207, even at the open position, serves as a resistance to the fluid flow. Therefore, the fluid pressure in the drain line 19d upstream of the shut-off valve 207 becomes excessively higher, i.e. higher than the off-set pressure $P_0$. Then, the pressure relief valve 209 becomes active to open for allowing the excessive pressure of the working fluid to flow through the by-pass line 210.

When the engine 200 stops, the pressure unit 20 ceases operation. By stopping of the pressure unit 20, the working fluid pressure in the supply line 19s drops. According to drop of the pressure in the supply line 19s, the pilot pressure to be exerted to the shut-off valve 207 via the pilot line 208 drops. When the pilot line 208 drops below or equal to the set pressure, the shut-off valve 207 is switched into shut-off position to block fluid communication therethrough. As a result, the fluid pressure in the drain line 19d upstream of the shut-off valve 207 becomes equal to the pressure in the upper fluid chamber 15d. Therefore, even when the working fluid leaks through a gap between the spool valve 19 and the inner periphery of the valve bore 18a, it will not affect the fluid pressure in the upper fluid chamber 15d.

This is advantageous to maintain the suspension characteristics of the suspension systems irrespective of the engine driving condition.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For instance, though the specific construction of the pressure control valve 18 is discussed hereabove in order to facilitate the better and full understanding of the invention, the pressure control valves which may achieve the similar or equivalent suspension characteristics control may also be applicable for establishing actively controlled suspension system according to the invention. For example, the pressure control valve having the equivalent or similar construction has been disclosed in the U.S. Pat. No. 4,702,490, issued on Oct. 27, 1987, which corresponds to the aforementioned European Patent First Publication No. 01 93 124. Furthermore, the hydraulic circuit set out above in terms of the preferred embodiment of the invention may be modified in any way.

As will be appreciated from the foregoing discussion, the present invention fulfills all of the objects and advantages sought therefor.

What is claimed is:

1. An actively controlled suspension system comprising:
   an hydraulic cylinder disposed between a vehicle body and a suspension member rotatably supporting a vehicular wheel, said hydraulic cylinder defining an internal space filled with a working fluid;
   a piston thrustingly disposed within said hydraulic cylinder and dividing the internal space of said hydraulic cylinder into first and second chambers, said piston being displacable according to relative motion between said vehicle body and said suspension member in bounding and rebounding directions;
   an hydraulic means associated with said first chamber of said hydraulic cylinder for adjusting the fluid pressure in said first chamber for controlling attitude of the vehicle, said hydraulic means including a pressure source and a pressure control valve which is electrically controlled for introducing pressurized working fluid into said first chamber and draining the working fluid in said first chamber depending upon the vehicle driving condition, said pressure control valve comprising a proportioning valve assembly having a valve element with a thrustingly variable valve position for adjusting working fluid flow rate therethrough; and
   an hydraulic circuit means for connecting said pressure source means and said pressure source means and said pressure control valve supplying pressurized fluid to said pressure source, said hydraulic circuit means being responsive to a source fluid pressure generated by said pressure source means below a predetermined pressure for blocking fluid flow from said pressure control valve to said pressure source means.

2. An actively controlled suspension system as set forth in claim 1, wherein said hydraulic circuit means incorporates a source fluid pressure responsive valve means provided in a drain line for returning the working fluid from said pressure control valve to said pressure source means, said source pressure responsive valve means being operated to an open position for establishing communication between said pressure control valve and said pressure source means via said drain line while said source fluid pressure is higher than a given pressure and to a shut-off position for blocking fluid communication through said drain line in response to the source fluid pressure lower than or equal to said given pressure.

3. An actively controlled suspension system as set forth in claim 2, wherein said hydraulic circuit means includes a supply line connecting said pressure source means and said pressure control valve for supplying the pressurized fluid to the latter therethrough, and a pilot line connecting said supply line to said source fluid pressure responsive valve means to introduce the pressure in said supply line as said source fluid pressure indicative pressure.

4. An actively controlled suspension system as set forth in claim 1, wherein said pressure source means comprises a pressure unit designed to be driven by means of an automotive engine.

5. An actively controlled suspension system as set forth in claim 4, wherein said hydraulic circuit means incorporates a source fluid pressure responsive valve means provided in a drain line for returning the working fluid from said pressure control valve to said pressure source means, said source pressure responsive valve means being operated to an open position for establishing communication between said pressure control valve and said pressure source means via said drain line while said source fluid pressure is higher than a given pressure and to a shut-off position for blocking fluid communication through said drain line in response to the source fluid pressure lower than or equal to said given pressure.

6. An actively controlled suspension system as set forth in claim 5, wherein said hydraulic circuit means includes a supply line connecting said pressure source means and said pressure control valve for supplying the pressurized fluid to the latter therethrough, and a pilot line connecting said supply line to said source fluid pressure responsive valve means to introduce the pressure in said supply line as said source fluid pressure indicative pressure.

7. An actively controlled suspension system as set forth in claim 6, wherein said hydraulic circuit means further includes a pressure adjusting means for adjusting the fluid pressure in said drain line upstream of said source fluid pressure responsive valve means to be lower than or equal to a predetermined pressure.

8. An actively controlled suspension system as set forth in claim 7, wherein said pressure adjusting means comprises a by-pass line connecting the drain line upstream of said source fluid pressure responsive valve means and down stream thereof by-passing said source fluid pressure responsive valve means and a pressure relief valve disposed in said by-pass line, which pressure relief valve being set a set pressure at said predetermined pressure.

9. An actively controlled suspension system comprising:
   an hydraulic cylinder disposed between a vehicular body and a suspension member rotatably supporting a vehicular wheel, said hydraulic cylinder defining an internal space filled with a working fluid;
   a piston thrustingly disposed within said hydraulic cylinder and dividing the internal space of said hydraulic cylinder into first and second chambers, said piston being displacable according to relative motion between said vehicle body and said suspension member in bounding and rebounding directions;
   an hydraulic means associated with said first chamber of said hydraulic cylinder for adjusting the fluid pressure in said first chamber for controlling attitude of the vehicle, said hydraulic means including a pressure source and a pressure control valve which is electrically controlled for introducing pressurized working fluid into said first chamber and draining the working fluid in said first chamber depending upon the vehicle driving conditions; and
   an hydraulic circuit means for connecting said pressure source means and said pressure control valve supplying pressurized fluid to said pressure control valve and returning the fluid to said pressure source, said hydraulic circuit means being responsive to a source fluid pressure generated by said pressure source means below a predetermined pressure for blocking fluid flow from said pressure control valve to said pressure source means;
   said hydraulic circuit means incorporating a source fluid pressure responsive valve means provided in a drain line for returning the working fluid from said pressure control valve to said pressure source means, said source pressure responsive valve means being operated to an open position for establishing communication between said pressure control valve and said pressure source means via said drain line while said source fluid pressure is higher than a given pressure and to a shut-off position for blocking fluid communication through said drain line in response to the source fluid pressure lower than or equal to said given pressure;

said hydraulic circuit means further including a pressure adjusting means for adjusting the fluid pressure in aid drain line upstream of said source fluid pressure responsive valve means to be lower than or equal to a predetermined pressure.

10. An actively controlled suspension system as set forth in claim 9, wherein said pressure adjusting means comprises a by-pass line connecting the drain line upstream of said source fluid pressure responsive valve means and down stream thereof by-passing said source fluid pressure responsive valve means and a pressure relief valve disposed in said by-pass line, which pressure relief valve being set a set pressure at said predetermined pressure.

11. An actively controlled suspension system as set forth in claim 10, wherein said pressure unit is a fluid pump.

12. An actively controlled suspension system comprising:

an hydraulic cylinder disposed between a vehicle body and a suspension member rotatably supporting a vehicular wheel, said hydraulic cylinder defining an internal space filled with a working fluid;

a piston thrustingly disposed within said hydraulic cylinder and dividing the internal space of said hydraulic cylinder into first and second chambers, said piston being displacable according to relative motion between said vehicle body and said suspension member in bounding and rebounding directions;

an hydraulic means associated with said first chamber of said hydraulic cylinder for adjusting the fluid pressure in said first chamber for controlling attitude of the vehicle, said hydraulic means including a pressure source and a pressure control valve which is electrically controlled for introducing pressurized working fluid into said first chamber and draining the working fluid in said first chamber depending upon the vehicle driving condition, said pressure control valve comprising a proportioning valve assembly having a valve element with a thrustingly variable valve position for adjusting working fluid flow rate therethrough; and an hydraulic circuit means for connecting said pressure source means and said pressure source means and said pressure control valve supplying pressurized fluid to said pressure source, said hydraulic circuit means being responsive to a source fluid pressure generated by said pressure source means below a predetermined pressure for blocking fluid flow from said pressure control valve to said pressure source means, said pressure control valve comprising a valve housing defining a valve bore, an inlet port connected to said pressure source means via supply line of said hydraulic circuit means, a drain line of said hydraulic circuit means and an outlet port connected to said first chamber of said hydraulic cylinder, a valve member disposed within said valve bore for thrusting movement therein for selectively establishing communication between said outlet port and said inlet port and between said outlet port and said drain port for controlling fluid pressure in said first chamber, and an electrically operable actuator associated with said valve member for driving the latter to control the valve position according to the vehicle driving condition.

13. An actively controlled suspension system as set forth in claim 12, which further comprises a control circuit including a sensor means for monitoring a vehicle driving condition to produce a suspension control parameter indicative signal and a controller processing said suspension control parameter indicative signal to produce a suspension control signal to be fed to said actuator for controlling operation thereof.

14. An actively controlled suspension system comprising:

an hydraulic cylinder disposed between a vehicle body and a suspension member rotatably supporting a vehicular wheel, said hydraulic cylinder defining an internal space filled with a working fluid;

a piston thrustingly disposed within said hydraulic cylinder and dividing the internal space of said hydraulic cylinder into first and second chambers, said piston being displacable according to relative motion between said vehicle body and said suspension member in bounding and rebounding directions;

an hydraulic means associated with said first chamber of said hydraulic cylinder for adjusting the fluid pressure in said first chamber for controlling attitude of the vehicle, said hydraulic means including a pressure source and a pressure control valve which is electrically controlled for introducing pressurized working fluid into said first chamber and draining the working fluid in said first chamber depending upon the vehicle driving condition, said pressure control valve comprising a valve housing defining a valve bore, an inlet port connected to said pressure source means, a drain port connected to said pressure source means, and an outlet port connected to said first chamber of said hydraulic cylinder, a valve member disposed within said valve bore for thrusting movement therein for selectively establishing communication between said outlet port and said inlet port and between said outlet port and said drain port for controlling fluid pressure in said first chamber, and an electrically operable actuator associated with said valve member for driving the latter to control the valve position according to the vehicle driving condition and an hydraulic circuit means for connecting said pressure source means and said pressure control valve supplying pressurized fluid to said pressure control valve and returning the fluid to said pressure source, said hydraulic circuit means including a supply line connecting said inlet port of said pressure control valve to said pressure source for supplying the source fluid pressure to said inlet port, a drain line for connecting said drain port of said pressure control valve to said pressure source means for returning the pressurized fluid from said pressure control valve to said pressure source means, and said hydraulic circuit means including a source fluid pressure responsive valve means being responsive to a source fluid pressure generated by said pressure source means below a predetermined shut-off pressure for blocking fluid flow from said pressure control valve to said pressure source means via said drain line.

15. An actively controlled suspension system as set forth in claim 14, wherein said source fluid pressure responsive valve means is designed to be operated to an open position for establishing communication between said pressure control valve and said pressure source means via said drain line while said source fluid pressure is higher than said predetermined shut-off pressure and to a shut-off position for blocking fluid communication through said drain line in response to the source fluid pressure lower than or equal to said given pressure.

16. An actively controlled suspension system as set forth in claim 15, wherein said hydraulic circuit means includes a pilot line connecting said supply line to said source fluid pressure responsive valve means to introduce the pressure in said supply line as said source fluid pressure indicative pressure.

17. An actively controlled suspension system as set forth in claim 14, wherein said hydraulic circuit means further includes a pressure adjusting means for adjusting the fluid pressure in said drain line upstream of said source fluid pressure responsive valve means to be lower than or equal to a predetermined pressure.

18. An actively controlled suspension system as set forth in claim 17, wherein said pressure adjusting means comprises a by-pass line connecting the drain line upstream of said source fluid pressure responsive valve means and down stream thereof by-passing said source fluid pressure responsive valve means and a pressure relief valve disposed in said by-pass line, which pressure relief valve being set a set pressure at said predetermined pressure.

19. An actively controlled suspension system as set forth in claim 14, wherein said pressure source means comprises a pressure unit designed to be driven by means of an automotive engine.

20. An actively controlled suspension system as set forth in claim 19, wherein said pressure unit is a fluid pump.

21. An actively controlled suspension system comprising:
an hydraulic cylinder disposed between a vehicle body and a suspension member rotatably supporting a vehicular wheel, said hydraulic cylinder defining an internal space filled with a working fluid;
a piston thrustingly disposed within said hydraulic cylinder and dividing the internal space of said hydraulic cylinder into first and second chambers, said piston being displacable according to relative motion between said vehicle body and said suspension member in bounding and rebounding directions;
an hydraulic means associated with said first chamber of said hydraulic cylinder for adjusting the fluid pressure in said first chamber for controlling attitude of the vehicle, said hydraulic means including a pressure source and a pressure control valve which is electrically controlled for introducing pressurized working fluid into said first chamber and draining the working fluid in said first chamber depending upon the vehicle driving condition; and
an hydraulic circuit means for connecting said pressure source means and said pressure control valve supplying pressurized fluid to said pressure control valve and returning the fluid to said pressure source, and said hydraulic circuit means including a source fluid pressure responsive valve means being responsive to a source fluid pressure generated by said pressure source means below a predetermined shut-off pressure for blocking fluid flow from said pressure control valve to said pressure source means via said drain line, and a pressure adjusting means for adjusting the fluid pressure in said drain line upstream of said source fluid pressure responsive valve means to be lower than or equal to a given pressure.

22. An actively controlled suspension system as set forth in claim 21, wherein said hydraulic circuit means incorporates a source fluid pressure responsive valve means provided in a drain line for returning the working fluid from said pressure control valve to said pressure source means, said source pressure responsive valve means being operated to an open position for establishing communication between said pressure control valve and said pressure source means via said drain line while said source fluid pressure is higher than said predetermined shut-off pressure and to a shut-off o position for blocking fluid communication through said drain line in response to the source fluid pressure lower than or equal to said predetermined shut-off pressure.

23. An actively controlled suspension system as set forth in claim 22, wherein said hydraulic circuit means includes a supply line connecting said pressure source means and said pressure control valve for supplying the pressurized fluid to the latter therethrough, and a pilot line connecting said supply line to said source fluid pressure responsive valve means to introduce the pressure in said supply line as said source fluid pressure indicative pressure.

24. An actively controlled suspension system as set forth in claim 23, wherein said pressure adjusting means comprises a by-pass line connecting the drain line upstream of said source fluid pressure responsive valve means and down stream thereof by-passing said source fluid pressure responsive valve means and a pressure relief valve disposed in said by-pass line, which pressure relief valve being set a set pressure at said given pressure.

25. An actively controlled suspension system as set forth in claim 21, wherein said pressure source means comprises a pressure unit designed to be driven by means of an automotive engine.

26. An actively controlled suspension system as set forth in claim 25, wherein said pressure unit is a fluid pump.

* * * * *